United States Patent [19]

Sayegh

[11] 4,407,447

[45] Oct. 4, 1983

[54] ENERGY CONTROL SYSTEM

[75] Inventor: Marshall Sayegh, Vacaville, Calif.

[73] Assignee: STA-TECH International, Inc., Winters, Calif.

[21] Appl. No.: 328,014

[22] Filed: Dec. 7, 1981

[51] Int. Cl.³ .............................. F24F 3/00; F24F 7/00
[52] U.S. Cl. ........................................... 236/49; 165/22
[58] Field of Search .................... 236/49, 78 B; 165/22

[56] References Cited

U.S. PATENT DOCUMENTS

| | | | |
|---|---|---|---|
| 3,724,534 | 4/1973 | Weatherston | 165/12 |
| 3,814,173 | 6/1974 | Coon | 165/12 |
| 3,865,181 | 2/1975 | Mori et al. | 165/22 |
| 3,882,928 | 5/1975 | Gazzo | 165/12 |
| 3,896,871 | 7/1975 | Pecoraro et al. | 165/22 |
| 3,934,797 | 1/1976 | Perlmutter | 236/46 |
| 4,174,064 | 11/1979 | Pratt, Jr. | 236/1 B |
| 4,179,691 | 12/1979 | Keller | 340/567 |
| 4,294,404 | 10/1981 | Gajjar | 236/49 |
| 4,307,576 | 12/1981 | Takano et al. | 62/204 |

Primary Examiner—William E. Wayner
Attorney, Agent, or Firm—Limbach, Limbach & Sutton

[57] ABSTRACT

An energy control system for a dwelling with a plurality of rooms is disclosed wherein said system has a plurality of occupancy sensors, with each sensor adapted to detect the presence of a human being in a room. The occupancy sensors are all connected to a computer with the computer controlling a plurality of dampers that regulate the air flow in the air ducts into the various rooms. Upon the detection of the presence of a human being in a room by the occupancy sensor, the computer sends a signal to the air damper controlling the air flow into that room to open the air flow through that air duct.

11 Claims, 7 Drawing Figures

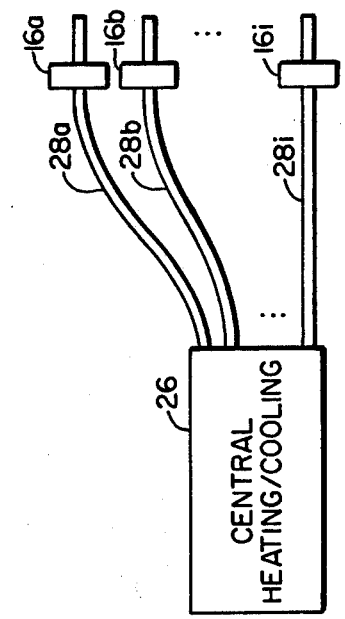
FIG. IA
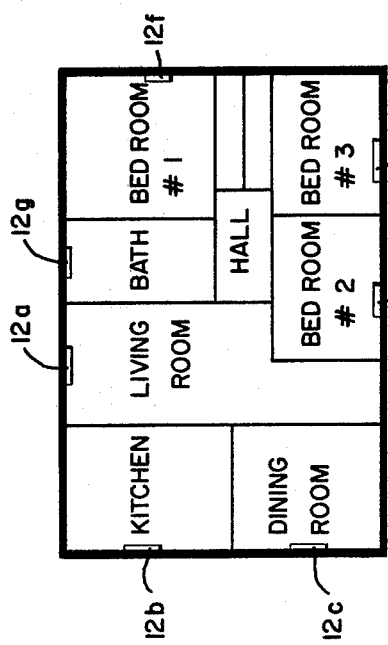
FIG. I
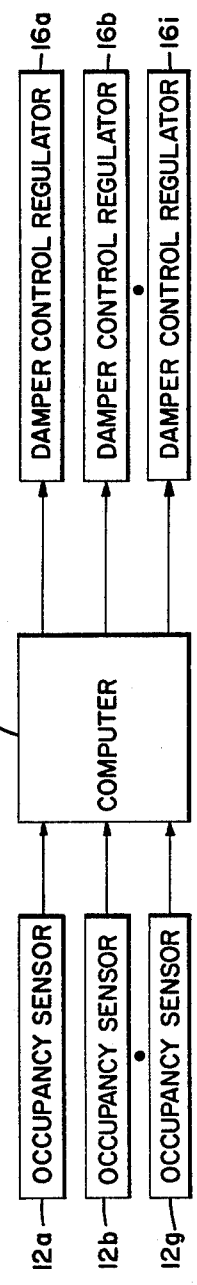
FIG. 2

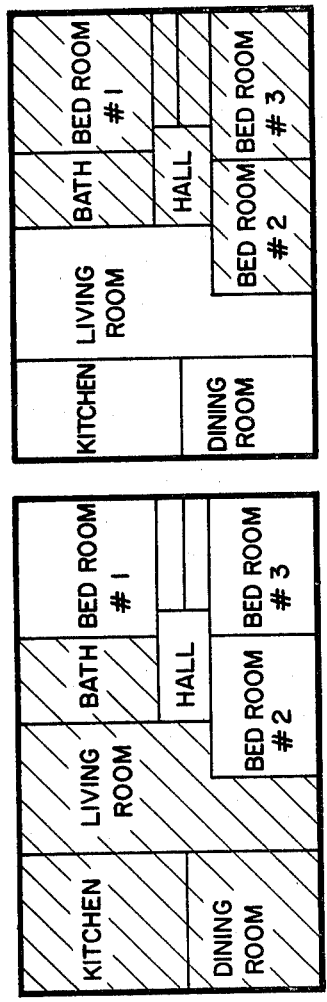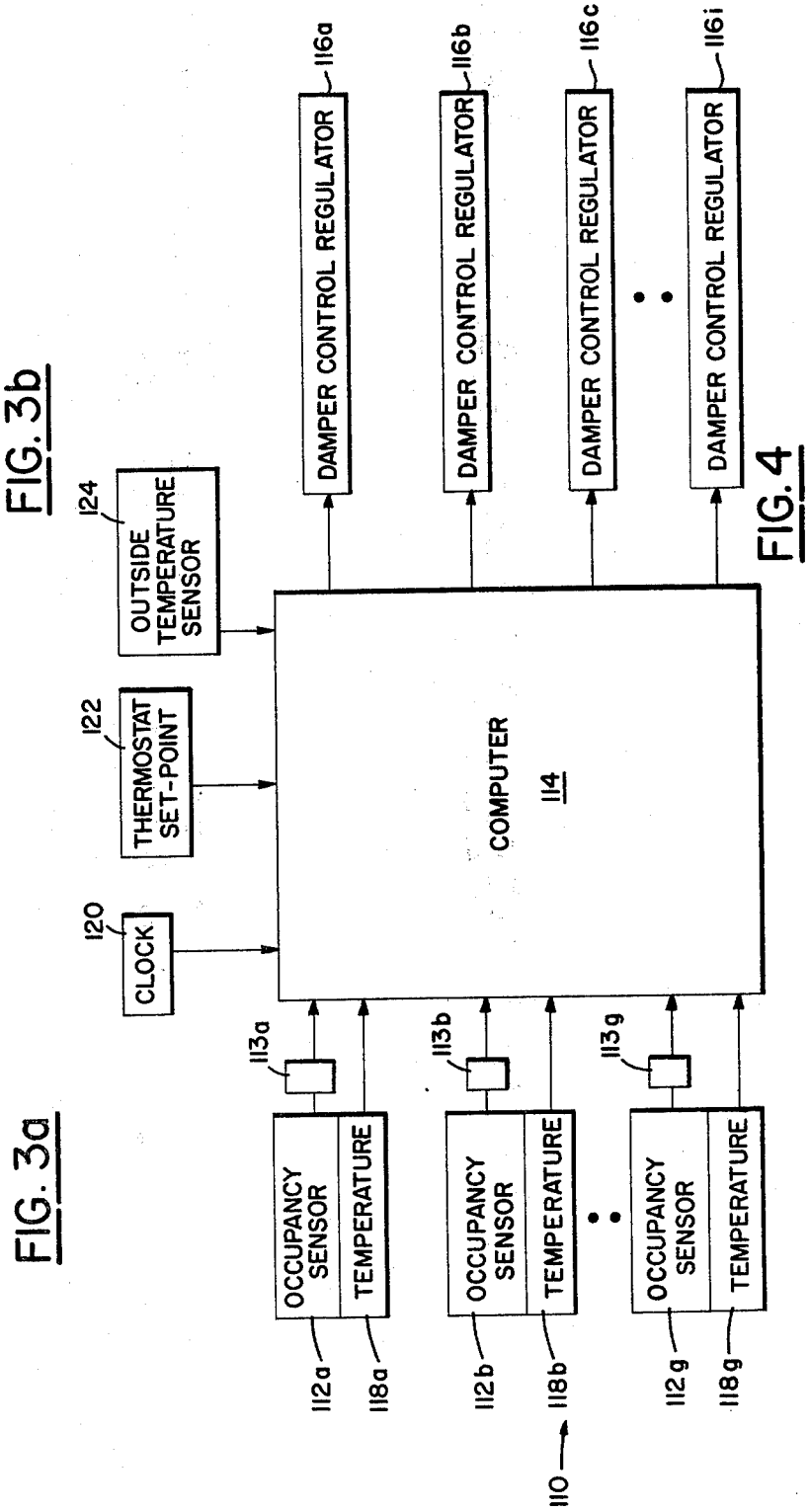

ENERGY CONTROL SYSTEM

BACKGROUND OF THE INVENTION

The present invention relates to an energy control system, and more particularly, to a system for controlling the air flow produced from a central forced air apparatus to rooms occupied by human beings, as detected by occupancy sensors.

Concern with energy consumption in heating or cooling a building or a dwelling has caused a number of systems to control the energy usage to be proposed. In U.S. Pat. No. 3,814,173, a forced air heating/cooling system has a plurality of room thermostats which open or close the air dampers. The thermostats are interrogated to determine the demand for the heated or cooled air. The fan speed of the heating/cooling unit is then adjusted in accordance to the demand. U.S. Pat. No. 3,865,181 also discloses a system wherein the air supply rate is controlled.

U.S. Pat. No. 3,882,928 and U.S. Pat. No. 3,724,534 both disclose heating or cooling of a dwelling by zones. Portions of the building are heated or cooled depending on the time of the day. Thus, in the daytime, the zone which is heated or cooled would be the living areas; whereas, in the nighttime, the zone of heating or cooling would be the sleeping quarters.

In U.S. Pat. No. 4,174,064 and U.S. Pat. No. 3,934,797, both disclose energy conserving systems based upon the condition of occupancy of the rooms. However, the condition of occupancy is a priori known; i.e., either by check-out status as in U.S. Pat. No. 4,174,064 or is clock cntrolled as in U.S. Pat. No. 3,934,797. In addition, both patents disclose two states of temperature control in each room: one range of temperature control for occupied status, with another range of temperature control for unoccupied status.

Computer control of the environment in a building is known. See, for example, U.S. Pat. No. 3,896,871. Infrared intrusion devices to detect the presence of an intruder within a region are also known. See, for example, U.S. Pat. No. 4,179,691.

SUMMARY OF THE INVENTION

Therefore, in accordance with the present invention, an energy control system for regulating the delivery of a fluid to a region to control the temperature of the region is disclosed. The region has a plurality of confined spaces; the fluid is generated by a generating means, in response to a thermostat, and is delivered to each of the confined spaces in a delivery channel means. The control system comprises a plurality of occupancy sensing means, with each occupancy sensing means adaptd to detect the presence of a human being in a confined space and to produce an occupancy signal in response thereto. A plurality of valve control means is located in the delivery channel means with one valve control means in each of the delivery channel means. Each of the valve control means can regulate the amount of fluid passing through the delivery channel means in response to a control signal. A logic means can receive the signals from the plurality of occupancy sensing means and can produce the control signals to activate the valve control means.

DETAILED DESCRIPTION OF THE DRAWINGS

FIG. 1 is a floor plan of a typical house, suitable for control by the system of the present invention.

FIG. 1a is a schematic block diagram of a central heating/cooling apparatus with a plurality of air ducts with which the system of the present invention is suitable for use.

FIG. 2 is a schematic block diagram of the system of the present invention.

FIGS. 3A and 3B are floor plans of the house of FIG. 1 with day/night operation.

FIG. 4 is a schematic block diagram of another embodiment of the system of the present invention.

DETAILED DESCRIPTION OF THE DRAWINGS

Figure 5:
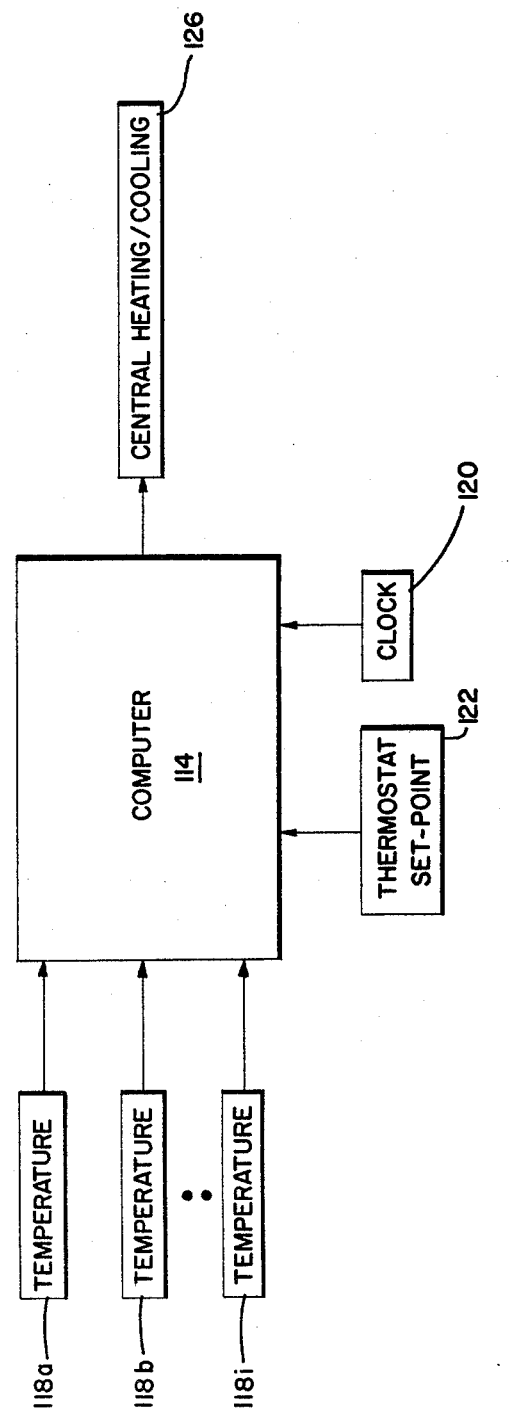
FIG. 5 is a schematic block diagram of a portion of the control system of the present invention which is also suitable for use for controlling the central heating/cooling unit.

Referring to FIG. 1, there is shown a dwelling which is comprised of a plurality of rooms. For the purpose of explanation of the present invention, a typical single-family housing unit was chosen as the dwelling. However, as will be seen, the system of the present invention may be applied in any type of dwelling in which there is a plurality of rooms or confined spaces. In the dwelling shown in FIG. 1, a central heating/cooling forced air apparatus 26 generates conditioned air, which is delivered to each of the rooms by a plurality of air ducts 28a–28i. The central forced air heating/cooling apparatus 26 and the plurality of air ducts 28a–28i are of conventional designed. Each room is serviced by at least one air duct, 28 and in the case of a large room, such as the living room, the room can be served by more than one air duct.

Referring to FIG. 2, there is shown a system 10 of the present invention. The system 10 comprises a plurality of occupancy sensors 12 (A-G). Each occupancy sensor 12 detects the presence of a human being in a room. Of course, more than one sensor per room may be required where the room is large, as in the example of a living room. The occupancy sensor 12 is of conventional design. Typically, they are infrared intrusion detectors, capable of detecting the presence of infrared radiation from a human being. Other types of occupancy sensor 12 include ultrasonic, active infrared, laser or contact switch. In response to the presence of a human being in the room, the occupancy sensor 12 produces an occupancy signal. All of the occupancy sensors 12 are connected to a computer 14. A plurality of damper control regulators 16 (A-I) are controlled by the computer 14. Each damper control regulator 16 is in each of the air ducts 28. In response to the signal from the computer 14, each damper control regulator 16 controls the amount of air passing through that particular air duct 28. The computer 14 receives the signals from all of the occupancy sensors 12 and in response to those occupancy sensors 12 which have detected the presence of human being, the computer 14 sends a control signal to the particular damper control regulator 16 to open the air duct 28 of which that particular damper control regulator 18 is regulating, and to deliver the conditioned air into that room from which the occupancy sensor 12 has detected the presence of a human being.

It should be noted that the system 10 of the present invention is directed to the regulation of the fluid flow, such as air, to rooms that are occupied as determined by the occupancy sensor 12. The system 10 of the present invention does not regulate the fan speed or the pressure of the forced air generated by the central heating/cooling apparatus 26. The system 10 of the present invention delivers conditioned air, i.e., heated or cooled air, to heat or cool people, as detected by the occupancy sensor, and not to heat or cool empty spaces. However, since the system 10 of the present invention does not control the fan speed or the pressure of the central forced air heating/cooling unit 26, in the event only a few persons occupy the dwelling, only a few damper control regulators 16 would be on or open. This could cause a back pressure within the central heating/cooling unit 26. Therefore, to alleviate the back pressure, the computer 14 can send a control signal to the damper control regulators 16 (A-I) to open the ducts 28 to the unoccupied rooms to alleviate the back pressure. Of course, the heating or cooling of the unoccupied room or rooms is accomplished only after the requirements of the occupied room have been fulfilled first. The directing of the conditioned air into unoccupied rooms is simply to alleviate the back pressure upon the central heating/cooling unit.

As previously described, the occupancy sensors 12(a-g) are of conventional design, such as passive infrared intrusion detectors. Each damper control regulator 16 (a-i) is also of conventional design, such as low voltage servo-motor actuated damper. The computer 14 can be any suitable microprocessor, such as Zilog Z-80. In addition, of course, hardwire logic, such as the occupancy sensor 12 triggering a relay to energize the particular damper control regulator 16, can be used instead of the computer 14. For safety reasons, it is desirable to have the control regulators 16 left normally open. In response to an occupancy signal from the occupancy sensors 12, the computer 14 will do nothing with respect to that particular regulator 16.

Referring to FIG. 3, there is shown a plane view of a dwelling having two zones: A daytime zone, as shown in FIG. 3A; and a nighttime zone, as shown in FIG. 3B.

Referring to FIG. 4, there is shown a system 110, which is another embodiment of the present invention. The system 110 comprises, as described heretofore, a plurality of occupancy sensors 112, with each occupancy sensor 112 detecting the presence of a human being in a room. The output of each occupancy sensor 112 is connected to the computer 114 through a delay 113. The computer 114 sends a control signal to the plurality of damper control regulator 116, each of which regulates the amount of air passing through the air duct 28 in which it is located, in response to the control signal from the computer 114. The system 110 also comprises a plurality of temperature sensing means 118 (A-G) with each temperature sensing means 118 measuring the temperature of each room and producing a temperature signal in response thereto. The output of each temperature sensing means 118 is connected to the computer 114. A clock 120 is connected to the computer 114. A thermostat set point 122, which is a temperature value set by the user and is used to activate the operation of the central heating/cooling unit 26, is also connected to the computer 114. Finally, an outside temperature sensor 124 is also connected to the computer 114. The operation of the system 110 may be understood as follows.

The clock 120 sets the time of day from which the type of zone, each room is in, is determined. For example, the living room, as shown in FIG. 3A, during the day is in the primary zone; whereas during the night, the living room, as shown in FIG. 3B, is in a secondary zone. The term "primary zone" is used to denote the zone of primary importance to the central heating/cooling unit 26 during that time of the 24-hour day. Similarly, the bedrooms, during the day are in the secondary zone, whereas during the night, they are in the primary zone. The plurality of temperature sensing means 118 (A-G) measure the temperature of the respective room each temperature sensing means 118 is in, and send that information to the computer 114. The thermostat setpoint 122 is the user-set temperature, to which the temparature as measured by the temparature sensing means 118 are compared. Finally, the outside temperature sensing means 124 measures the temperature of the air outside of the dwelling in order to provide the computer 114 with a measure of the capacity of the heating/cooling capability of the central forced air unit 26.

In the operation of the system 110 of the present invention, as previously described, the occupancy sensors 112(A-G) determine the presence or absence of a human being within each room by generating occupancy signals. These occupancy signals are sent to the computer 114 after passing through the delay 113. Typically, the delay 113 is on the order of three (3) minutes. This delay is to permit occupants to enter into a room, stay briefly, and then to leave the room without activating the system 110. At the same time, the temperature from the temperature sensing means 118 of all the rooms are also sent to the computer 114. The temperature of the occupied room, as determined by the temperature sensing means 118, is compared to the temperature from the thermostat set-point 122. In the event the temperature, as sensed by the temperature sensing means 118, indicates that the temperature of that occupied room is sufficient, as compared to the thermostat set-point 122, the computer 114 activates the control regulator 116 to close the air flow into that room. By sufficient, it is meant that in the event the central heating/cooling apparatus 26 is in the heating mode and the temperature sensed by the temperature sensing means 118 is substantially at or above the temperature set by the thermostat set-point 122, then the temperature of the occupied room is sufficient. Conversely, if the central heating/cooling apparatus 26 is in the cooling mode, and the temperature as sensed by the temperature sensing means 118 of the occupied room is substantially at or below the temperature set by the thermostat set-point 122, then that occupied room is also sufficient. In the event the temperature sensed by the temperature sensing means 118 as compared to the thermostat set-point 122 is insufficient, the computer 114 would then send a control signal to that particular damper control regulator 116 to regulate opening of the air regulator of that air duct leading into that occupied room. The computer 114 would first satisfy the air flow to all the rooms which are occupied and which are insufficient as determined by the temperature in that room compared to the thermostat set-point 122. In the event the central heating/cooling apparatus 26 has more capacity than the demand of the occupied rooms that are insufficient, then the computer 114 sends control signals to the damper control regulators 116 to regulate opening of the air ducts to the unoccupied rooms in order to alleviate any back pressure on the central heating/cooling unit. The priority of delivering conditioned air into unoccupied rooms is determined as follows. First, the computer 114 attempts to deliver air into unoccupied rooms in the primary zone which are temperature insufficient. Moreover, within those unoccupied rooms in the primary zone which are temperature insufficient, the system 110 satisfies the temperature demand of those rooms in the order of priority of first to those rooms which have the highest differential in temperature between the temperature of that room and the thermostat set-point 122. Thus, the excess capacity is first delivered to all the unoccupied rooms which are temperature insufficient within the primary zone. In the event there is still capacity leftover from the central heating/cooling unit, the computer 114 would direct control signals to the damper control regulator 116 regulating the opening of the air ducts to unoccupied rooms in the other zones. The above-outlined priority of delivery of air can be implemented by a computer program in the computer 114.

As is well known, the capacity of any central heating/cooling unit is determined by its BTU output. The amount of space or volume of air which the central heating/cooling unit 26 can heat or cool within a dwelling is determined in part by the outside temperature, by the insulation of the dwelling, and by the particular activities within the dwelling, such as the number of occupants and heating and cooking, etc. However, the largest component of the above which determines the capacity of the central heating/cooling unit is determined by the outside temperature. Thus, an outside temperature sensing means 124 provides a measurement of the temperature outside the dwelling and this information is entered into the computer 114. Based on the outside temperature sensing means 124, the computer 114 also determines the capacity of the central heating/cooling unit 26 and regulates the damper control regulators 116 in response thereto. If there is a large capacity, and all the occupied rooms are temperature satisfied, then the computer 114 would control the damper control regulator 116 to open the air ducts to the temperature insufficient unoccupied rooms, first to those in the primary zone, and secondarily to other unoccupied rooms in other zones.

Referring to FIG. 5, there is shown yet another use for the system 110 of the present invention. A plurality of temperature sensing means 118 have outputs which are entered into the computer 114. The clock 120 and the thermostat set-point 122 are also connected to the computer 114 and are as previously described. The computer 114 is connected to the central heating/cooling apparatus 126. However, in the embodiment shown in FIG. 5, the thermostat set-point 122 does not activate directly the central heating/cooling apparatus 126. Instead, the computer 114 determines the temperature, as detected by the temperature sensing means 118 of each of the rooms in the primary zone based on the time of the day as supplied by the clock 120. In the event a majority of the temperature sensing means 118 in the primary zone as compared to the thermostat set-point 122 indicates that the temperature in those rooms are insufficient, the computer 114 would then activate the central heating/cooling unit 126. Insofar as the user is concerned the operation of the thermostat set-point 122 is the same as previously.

The occupancy sensor 112, damper control regulator 116 and computer 114 are all as previously described. The delay 113 can be an adjustable solid state delay. Each of the temperature 118 is of well known design, such as thermocoupler or voltage type reader. The thermostat set-point 122 and the outside temperature 124 are temperature sensing devices and can be of the same design as the temperature sensors 118.

There are many advantages of the system of the present invention. First and foremost is that, with the system of the present invention, the system does not control the speed of the fan of the central heating/cooling unit. Thus, the control system is much simpler in operation. Furthermore, the system of the present invention is directed to heating or cooling rooms which are occupied by human beings—not empty rooms. Moreover, since the present system is directed to supplying conditioned air to rooms which are occupied, and not all the rooms of the dwelling are occupied one hundred percent (100%) of the time, a much smaller central heating/cooling unit than a conventional unit can be used in such a dwelling. Thus, there will be considerable savings in the size of the central heating/cooling unit. Of course, comfort is still maintained, and to the user, the system of the present invention is the same as the prior art operation.

What is claimed is:

1. A fluid control system for regulating the delivery of a fluid to a region to control the temperature of said region, wherein said region having a plurality of confined spaces, said fluid generated by a generating means in response to a thermostat, and delivered to said confined spaces in a plurality of delivery channel means, said control system comprising:

a plurality of occupancy sensing means, with each occupancy sensing means for detecting the presence of a human being in a confined space, and to produce an occupancy signal in response thereto;

a plurality of valve control means with one valve control means in each of said delivery channel means, each of said valve control means for regulating the amount of fluid passing through said delivery channel means in response to a control signal;

a plurality of temperature sensing means, with each temperature sensing means for measuring the temperature of each confined space and for producing a temperature signal in response thereto; and logic means for receiving said plurality of occupancy signals and temperature signals and for producing control signals to activate the valve control means to direct the delivery of said fluid to the confined spaces in accordance with the following priority until the capacity of said generating means is reached:

(a) all occupied confined spaces as detected by the occupancy sensing means, wherein the temperature signal of each occupied confined space is compared to said thermostat and in the event the temperature of said occupied confined space is insufficient, said logic means is adapted to control the valve control means to deliver said fluid to said occupied confined spaces until the temperature of said space is sufficient; and (b) unoccupied confined spaces in accordance with the following priority, wherein the temperature signal of each unoccupied confined space is compared to said thermostat, and said logic means is adapted to control the valve control means to deliver the fluid to the confined space which is insufficient and which has the highest differential between the temperature of said confined space and said thermostat.

2. The system of claim 1, wherein said region is a dwelling; and each confined space is a room.

3. The system of claim 2, wherein
said fluid is air;
said generating means is a central heating or cooling forced air apparatus;
each delivery channel means is an air duct; and
each valve control means is an air damper means.

4. The system of claim 3 further comprising
a plurality of delay means; and
each of said occupancy signal is passed through a delay means to said logic means;
said system for delivering air to an occupied room as detected by said occupancy sensing means after a period of time set by said delay means and said room is still occupied.

5. The system of claim 4, wherein each of said occupancy sensing means is an infrared detector.

6. The system of claim 4 wherein each of said occupancy sensing means is an ultrasonic detector.

7. The system of claim 4, wherein each room is categorized into a plurality of time dependent zones.

8. The system of claim 7, wherein said system is adapted to produce control signals to said air damper means to direct the air flow to the rooms in accordance with the following priority:
(a) occupied rooms as detected by the occupancy sensing means that are temperature insufficient;
(b) unoccupied rooms in the primary zone, in accordance with the priority of rooms which are temperature insufficient and which have the highest differential between the temperature of said room and said thermostat; and
(c) unoccupied rooms that are temperature insufficient in other zones.

9. The system of claim 8, wherein said logic means is further adapted to activate said central forced air apparatus in the event a percentage of the temperature of the rooms in the primary zone, as compared to said thermostat is insufficient.

10. The system of claim 9, wherein said percentage is at least a majority of the temperature sensing means.

11. The system of claim 10, further comprising
an outside temperature sensing means adapted to measure the temperature outside of said dwelling;
said outside temperature sensing means connected to said logic means.

* * * * *